No. 664,722. Patented Dec. 25, 1900.
T. W. CASTLEMAN.
PLAITING APPARATUS.
(Application filed July 3, 1900.)
(No Model.) 6 Sheets—Sheet 1.
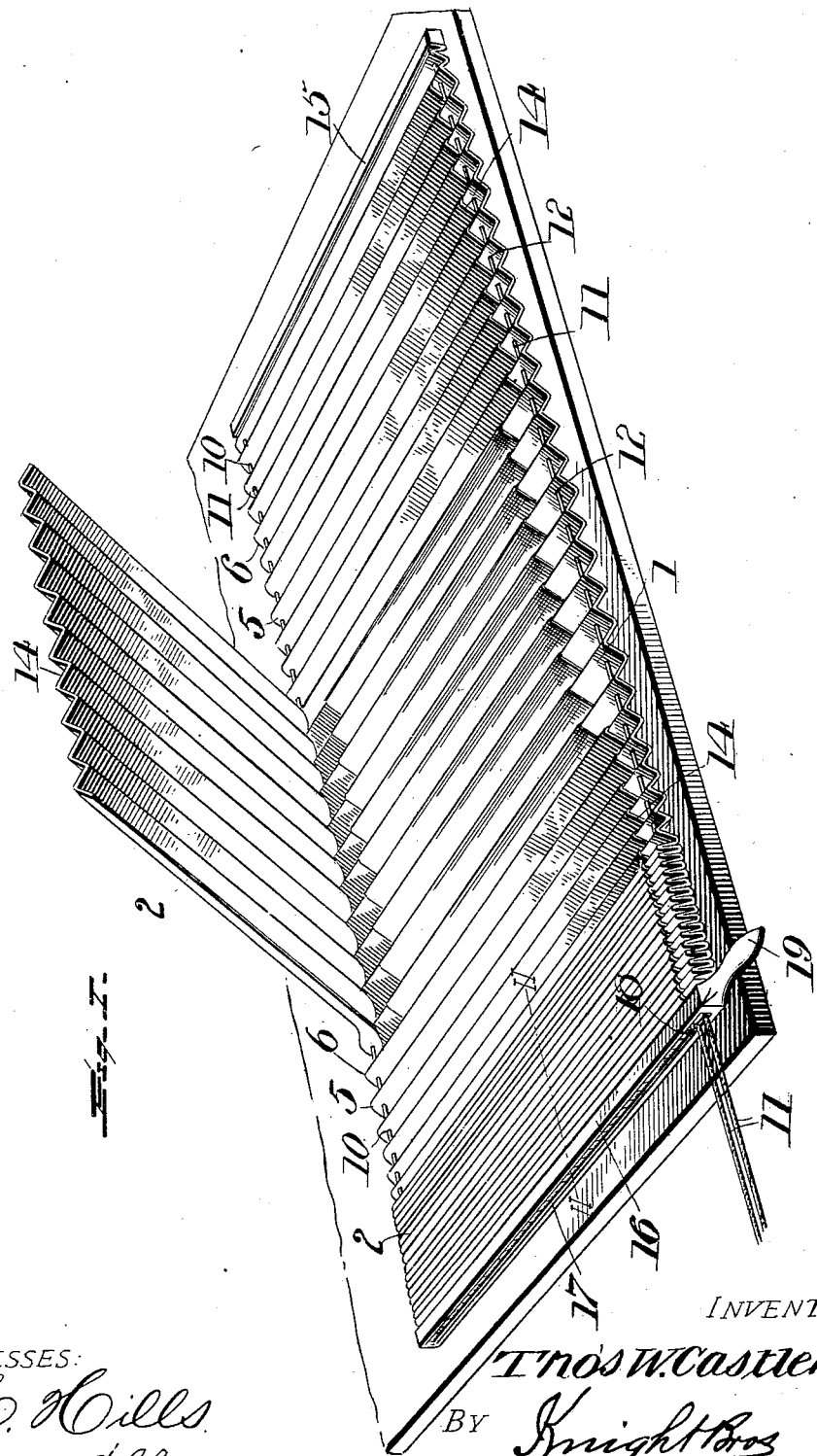
WITNESSES:
L. C. Hills
Walter Allen.
INVENTOR
Thos W. Castleman,
By Knight Bros
Attorneys

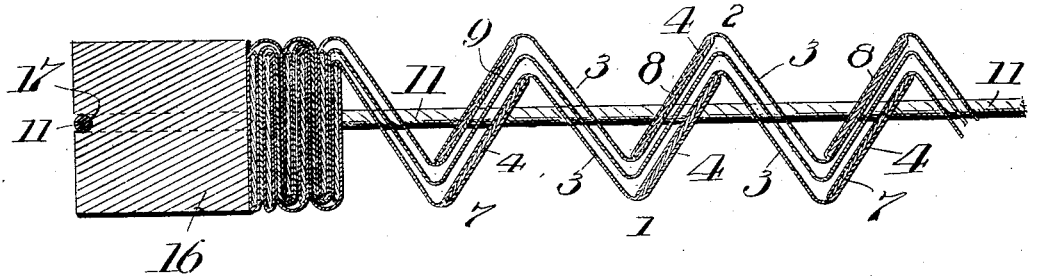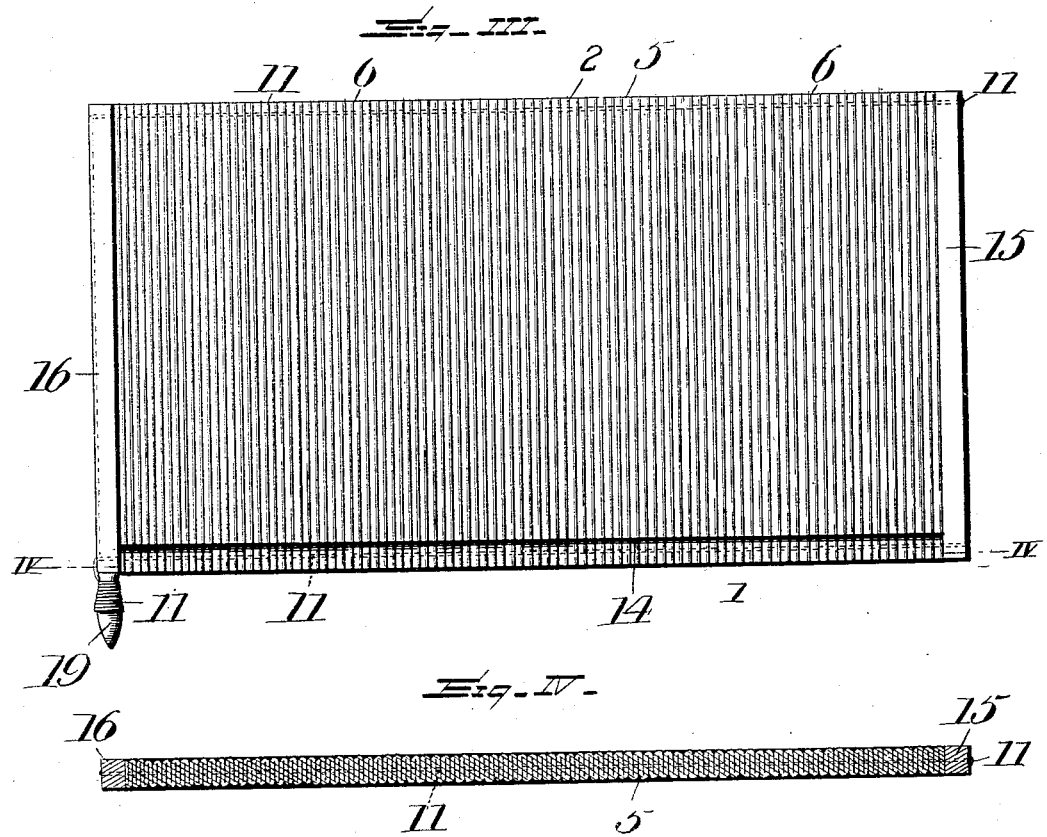

No. 664,722. Patented Dec. 25, 1900.
T. W. CASTLEMAN.
PLAITING APPARATUS.
(Application filed July 3, 1900.)
(No Model.) 6 Sheets—Sheet 3.
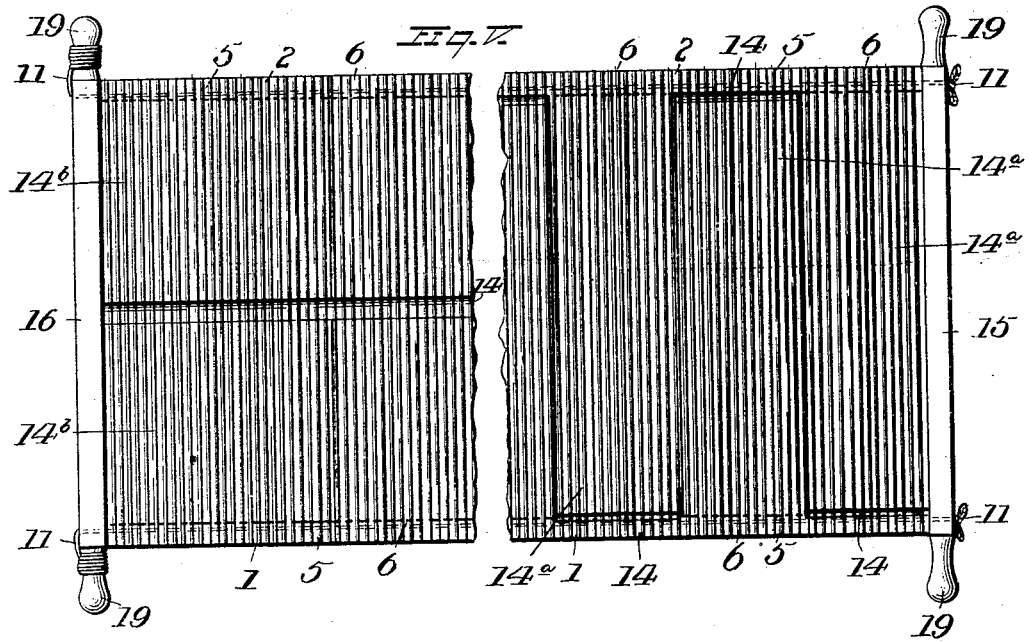
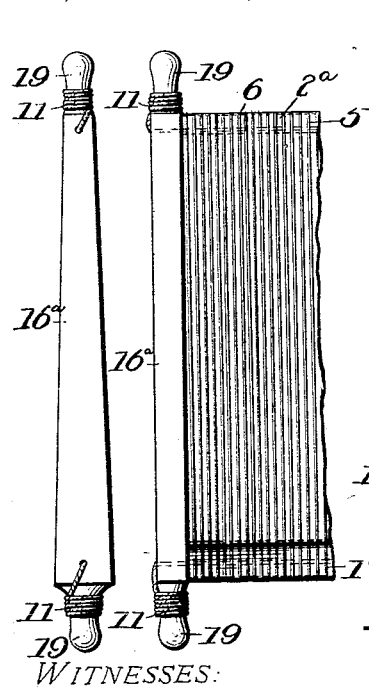
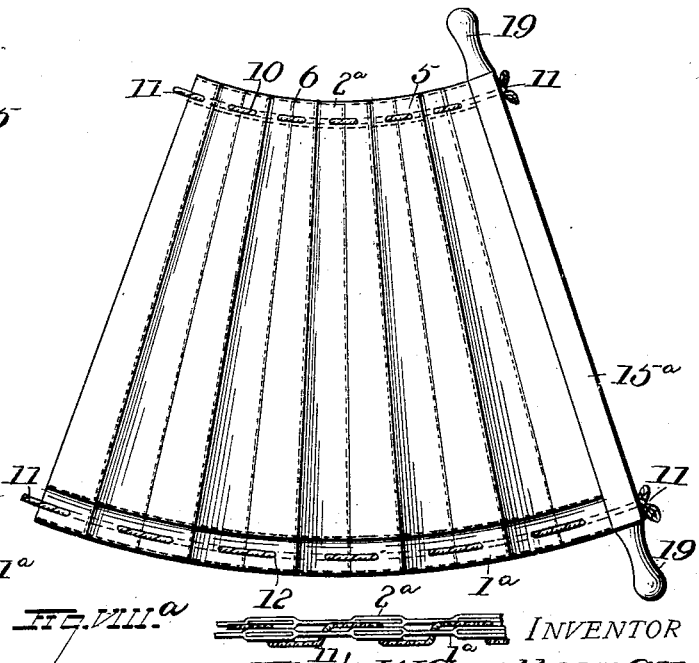
WITNESSES:
INVENTOR
Thos. W. Castleman,
BY Knight Bros
Attorneys

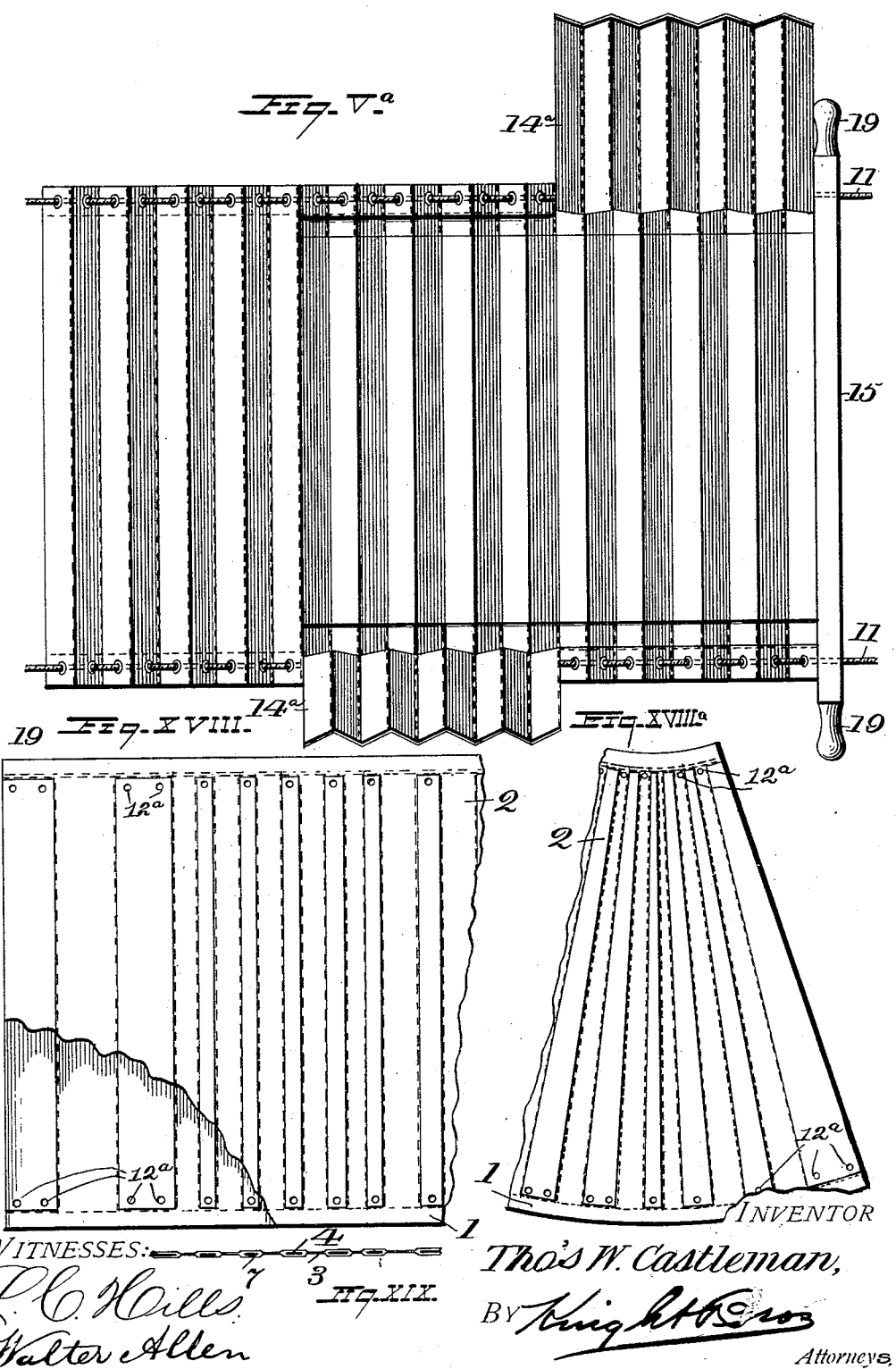

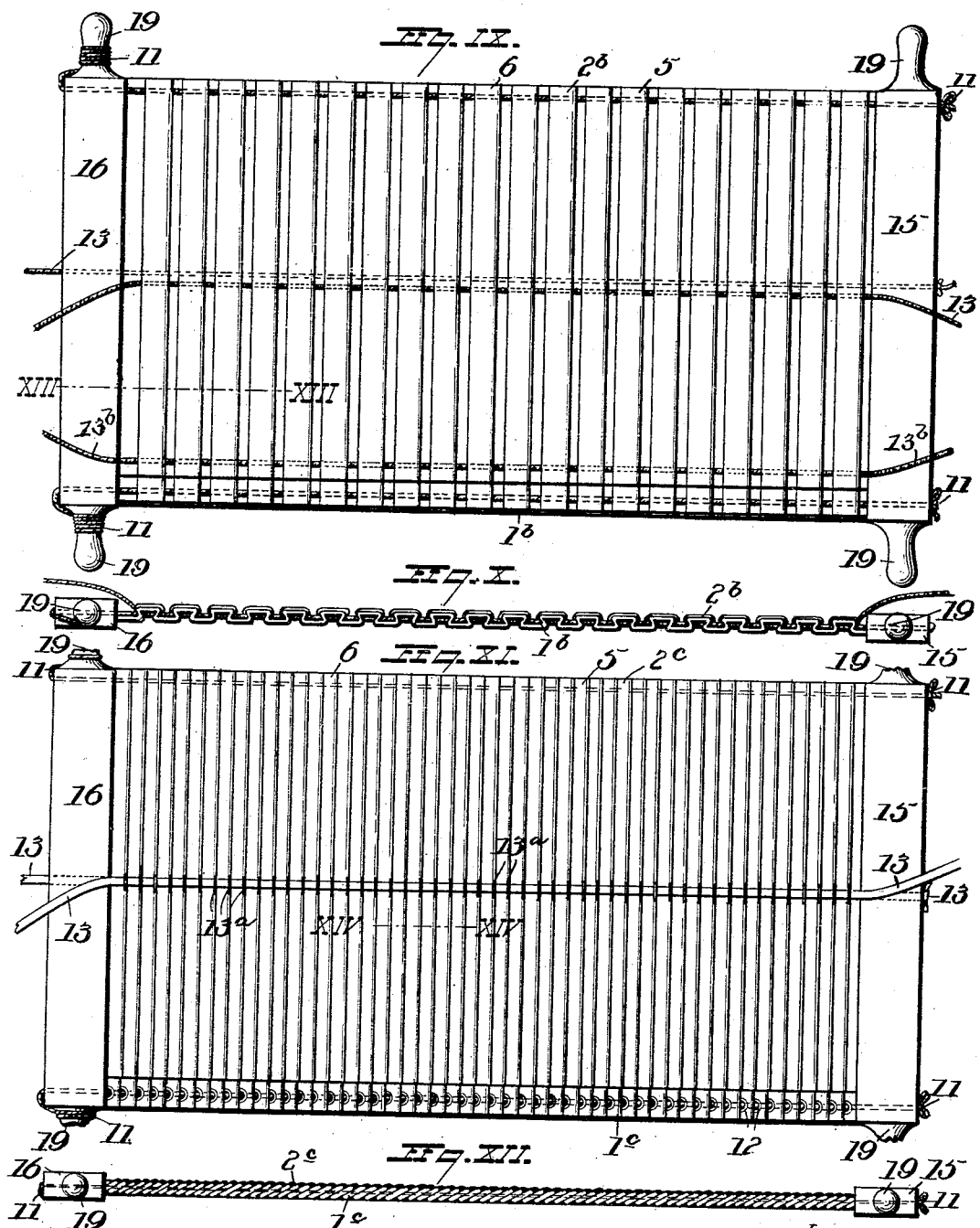

No. 664,722. Patented Dec. 25, 1900.
T. W. CASTLEMAN.
PLAITING APPARATUS.
(Application filed July 3, 1900.)
(No Model.) 6 Sheets—Sheet 6.
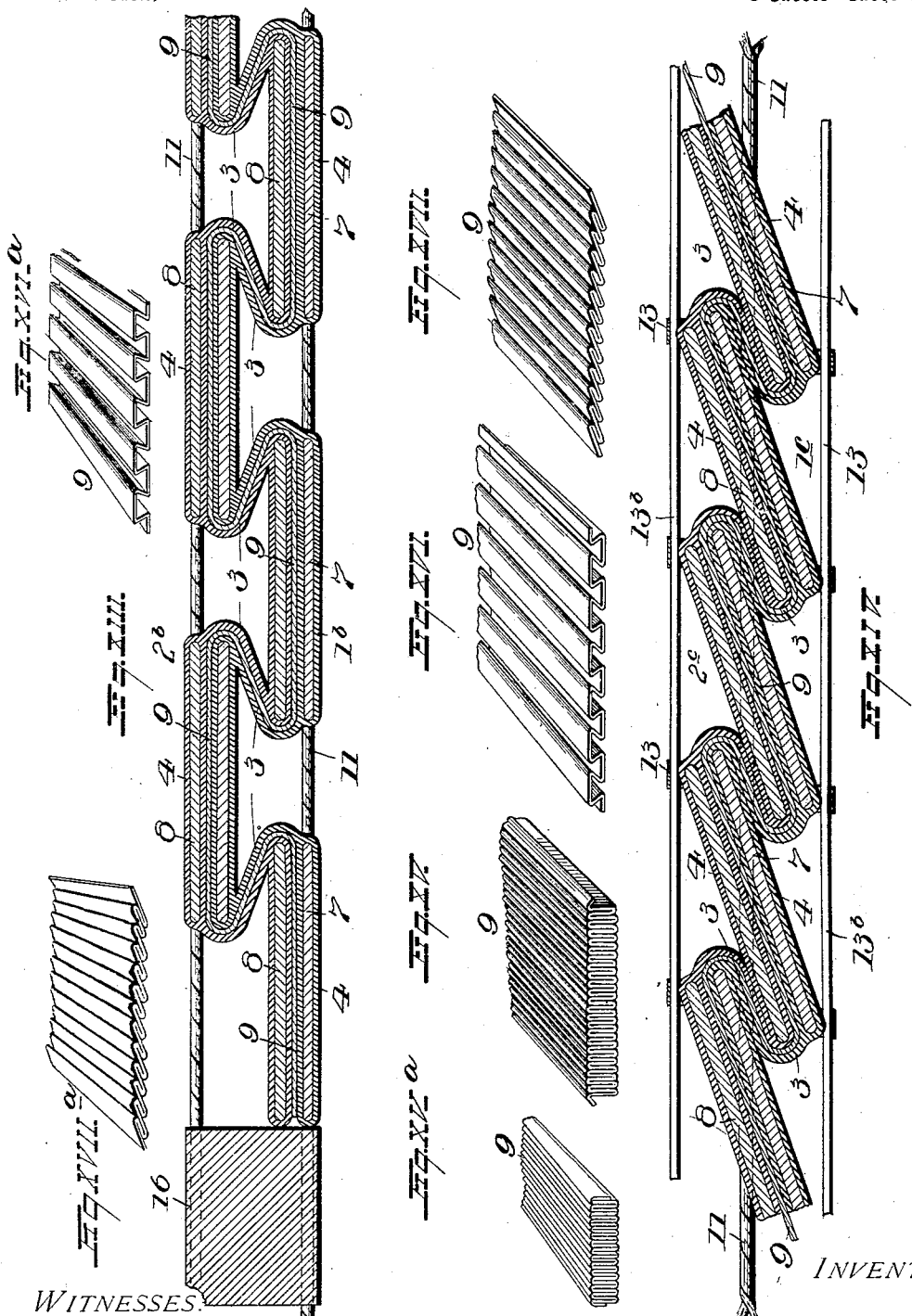
WITNESSES:
L. C. Hills.
Walter Allen
INVENTOR
Thos. W. Castleman,
BY Knight Bros
Attorneys

UNITED STATES PATENT OFFICE.

THOMAS W. CASTLEMAN, OF NEW ORLEANS, LOUISIANA.

PLAITING APPARATUS.

SPECIFICATION forming part of Letters Patent No. 664,722, dated December 25, 1900.

Application filed July 3, 1900. Serial No. 22,423. (No model.)

*To all whom it may concern:*

Be it known that I, THOMAS W. CASTLEMAN, a citizen of the United States, and a resident of New Orleans, in the parish of Orleans and State of Louisiana, have invented certain new and useful Improvements in Plaiters, of which the following is a specification.

My invention relates to improvements on my plaiter shown, described, and claimed in my application for Letters Patent of the United States, filed January 22, 1900, Serial No. 2,399.

The object of my present improvement is to greatly simplify my plaiter both in its construction and work and also to facilitate the production of accordion, tapered, box, knife, mixed, and other plaiting.

This invention, as in my former invention above referred to, does not depend on frames and guides, and instead of two separate matrices, as in my former invention, I provide one matrix made in double form, so that the upper matrix member may be lifted and opened from the lower matrix member as a hinged cover to the latter, either as a whole or in sections from side to side or from a central line between the sides toward the latter, the upper matrix member being preferably divided into sections, so that the work may be examined at any desired spot or place without lifting the whole upper matrix member. By making the matrix in double form instead, as in previous constructions, of two separate members a new and valuable result is obtained in that the folds of the intermeshing members are kept in strict alinement and there is no liability of the intermeshing folds getting out of alinement in rapid work. I utilize the holes for the locking-rods of my previous construction for the purpose of running strong gathering and sustaining cords therethrough.

My invention consists, first, in a plaiter having a double matrix in which its lower and upper matrix members are formed integral at one side.

My invention consists, secondly, in a plaiter having the upper matrix member divided into sections extending entirely or partly across the lower matrix member.

My invention consists, thirdly, in combining with the double matrix of a plaiter having its upper and lower matrix members provided with holes in the ends of the folds thereof, cords running through the holes for gathering the folds of the said matrix members together and holding the same in a solid mass.

In order that my invention may be fully understood, I will proceed to describe it with reference to the accompanying drawings, in which—

Figure I is a perspective view of my improved accordion-plaiter having a sectional upper matrix member, one of the sections being open. Fig. II is a detail vertical longitudinal section on a much larger scale on the line II II, Fig. I. Fig. III is a top view of the accordion-plaiter. Fig. IV is an elevation of the inner side of the same. Fig. V is a top view of the accordion-plaiter, showing a modification in the sectioning of the upper matrix member. Fig. V$^a$ is a detail plan view thereof open. Fig. VI is a detail top view of one end of a taper plaiter. Fig. VII is an end view thereof. Fig. VIII is a detail top view of the other end of the same when spread out. Fig. VIII$^a$ is a detail view of the outer side of the latter. Fig. IX is a top view of a box-plaiter. Fig. X is an elevation of the outer side thereof. Fig. XI is the top view of a knife-plaiter. Fig. XII is an elevation of the outer side thereof. Fig. XIII is an enlarged detail longitudinal section of the box-plaiter on the line XIII XIII, Fig. IX. Fig. XIV is an enlarged detail longitudinal section of the knife-plaiter on the line XIV XIV, Fig. XI. Fig. XV is a detail perspective view of accordion-plaiting. Fig. XV$^a$ is a detail perspective view of taper plaiting. Fig. XVI is a detail perspective of box-plaiting. Fig. XVI$^a$ is a detail perspective view of taper box-plaiting. Fig. XVII is a detail perspective view of knife-plaiting. Fig. XVII$^a$ is a perspective view of taper knife-plaiting. Fig. XVIII is a detail top view of a mixed plaiter for straight work, partly broken away. Fig. XVIII$^a$ is a similar view of a mixed plaiter for taper work. Fig. XIX is a detail side view of two-ply fabric which may be employed for each matrix member.

Referring to Figs. I, II, III, and IV, the plaiter is constructed for accordion-plaiting, and comprises a double matrix having a lower matrix member 1 and an upper matrix member 2, formed in one piece and constructed with corresponding intermeshing folds. The fabric of the double matrix in this instance is a single piece of material having alternating transverse single webs 3 and double webs 4, and a longitudinal single web 5 between the inner ends of the transverse webs, the cloth or piece of material being folded at 6 in line with the longitudinal single web, so that the upper matrix member provides an intermeshing fold cover to the lower matrix member. 7 indicates the lower stiffening-strip pockets within the lower double webs 4 and 8 the upper stiffening-strip pockets within the upper double webs 4. The goods 9 to be worked upon are placed on the lower matrix member, as usual. Series of holes 10 are formed in the ends of the folds of the longitudinal web at the inner side of the double matrix for a gathering and sustaining cord 11, while series of holes 12 are formed in the ends of the folds at the outer side of the lower matrix member, through which another gathering and sustaining cord 11 is run. 13 indicates additional gathering cords or tapes which run through clips $13^a$, secured to the folds. The upper matrix member has its outer edge 14 located within the inner side of the series of outer holes 12, so that the seating or intermeshing of the folds of the upper matrix member upon the folds of the lower matrix member is not interfered with. The upper matrix member may be formed in sections $14^a$, extending from one side, as shown in Fig. I, so that different parts of the work may be examined at will. 15 is an inner clamping-bar through which the inner ends of the gathering-cords 11 are passed and to which they are secured in a suitable manner by knots, for instance, or otherwise. 16 is an outer clamping-bar having holes through which the free ends of the gathering and sustaining cords are passed, a groove 17 for receiving the outer part of the inner gathering-cord and an eye or staple 18 adjacent to the outer hole of the outer clamping-bar for leading the outer part of the inner cord to position against the outer gathering and sustaining cord where the gathering and sustaining cords are led off parallel with each other. The clamping-bars are provided with handles 19, around which the cords may be coiled or otherwise fastened.

Referring to Figs. V and $V^a$, I show a modification in the sectioning of the upper matrix member 2 of the matrix, in which the sections $14^a$ at one end of the matrix are integral with the lower matrix member first on one side and then on the other, the sections $14^a$ extending entirely across the work in each case. At the other end of the matrix the sections $14^b$ of the upper matrix member are integral with the lower matrix member at the sides, the sections $14^b$ of the upper matrix member meeting at the center. Thus three forms of sectioning, 14, $14^a$, and $14^b$ are shown, any one of which may be used or adopted, according to the nature of the work, one form being better in some cases and another form being better in others. The arrangement of the sections $14^a$, opening first on one side and then on the other side, is preferable in most cases, for by this arrangement it is not only easier to examine the work at different places, but the goods as a rule are held more securely in place than where the upper matrix member opens entirely from one side or from the center.

Referring to Figs. VI, VII, VIII, and $VIII^a$, I show my plaiter for taper work, which is narrow at one side and wide at the other side. This plaiter has wedge-shaped clamping-bars $15^a$ $16^a$ and segmental matrix members $1^a$ and $2^a$.

Referring to Figs. IX, X, and XIII, I show my plaiter adapted for boxwork, in which the lower and upper matrix members $1^b$ $2^b$ have wide and narrow folds which are folded together alternately in opposite directions, so as to produce horizontal overlapping wide and narrow folds for forming box-plaits. $13^b$ is a gathering or sustaining cord for the upper matrix member.

Referring to Figs. XI, XII, and XIV, I show my plaiter adapted for knifework, in which the lower and upper matrix members $1^c$ $2^c$ have corresponding intermeshing wide and narrow folds. The gathering and sustaining cords extend through holes in the ends of the wide folds from the clamping-bars 15. By withdrawing the cords from the knife-plaiter and arranging them as in the box-plaiter, or vice versa, the plaiter becomes either a box-plaiter or knife-plaiter, for the reason that the matrix members for a box-plaiter or knife-plaiter are provided with a similar arrangement of wide and narrow folds.

Referring to Figs. XVIII and $XVIII^a$, I show a simple form of mixed plaiter for straight or tapered work of different kinds, according to the position in which one matrix member is fixed with relation to the other, whereby plaits of different kinds may be formed on goods arranged as desired within the plaiter. In this instance the clamping-bars and gathering and sustaining cords may be dispensed with, while series of holes $12^a$ are provided to enable the seamstress or user to stitch or pin the lower and upper matrix members together in desired relation to one another for straight or inclined work. Each of the matrix members may be formed of two-ply fabric, as shown in Fig. XIX, instead of alternating single and double webs.

When it is desired to plait a piece of goods, the matrix members are first opened and smoothed out flat upon a table, board, or other convenient surface, the upper matrix member being opened and laid back. The cloth is then placed on the lower matrix member and the two members smoothed out together, generally with the hand. Then the upper matrix member is folded or closed down over upon the cloth, and the whole is again smoothed out by gentle rubbing by the hands; but this latter smoothing is not always necessary. This being accomplished the gathering and sustaining cords are slowly pulled through the movable clamping-bars, so as to gradually draw the matrix members into a firm and solid pack or mass of folds. As this manipulation of the plaiter goes on each particular fold is drawn and pressed into place by the fingers, and the upper matrix member is constantly pressed down by the hand or in any convenient manner, so that it is kept down between the folds of the lower matrix member. In this way the material is quickly and beautifully plaited, according to the shape and arrangement of the matrix members. In some instances it will be found desirable to baste or pin the matrix members and the material together, according to the form of plait desired. This also facilitates the rapid gathering and sustaining of the whole and keeps all the parts together. After the matrix members are gathered and sustained firmly together the gathering and sustaining cords are wrapped around the handles of the clamping-bars, and then the entire plaiter, with the goods, may be kept ironed, steamed, or otherwise treated, as the operator desires.

The great advantage of making the matrix integral or of one piece of cloth or material lies in the fact that this arrangement enables the work of plaiting to be commenced more easily than where separate matrix members are employed, for the reason that a single piece can be handled and pressed into desired form with much greater facility than the two separate matrix members heretofore employed. The present construction in having one matrix member separated at one side from the other matrix member has another great advantage, in that the operator may plait only one part of a given piece of goods—that is, if the goods are forty inches wide the operator may plait to the extent of ten inches or twelve inches or any desired width, leaving the balance unplaited and susceptible of such cutting, trimming, or other manipulation as may be desired by the dressmaker. This cannot be done where use is made of the form shown in my previous application, hereinbefore referred to, unless the means for holding the matrices together does not extend through the folds of one of the matrices on one side. In the present construction the alternate single and double webs of the matrix members coincide, so that the pockets of each matrix member are located on the same side of each fold.

Instead of combined single and two ply fabric I may employ two-ply fabric for the matrix members, as shown in Fig. XIX.

Having thus described my invention, the following is what I claim as new therein and desire to secure by Letters Patent:

1. A plaiter comprising a matrix having its lower and upper matrix members formed integral so as to keep the intermeshing folds of the matrix members in correct alinement.

2. A plaiter comprising a matrix having its lower and upper matrix members formed integral at their inner side so as to keep the intermeshing folds of the matrix members in correct alinement.

3. A plaiter comprising a matrix formed with alternating single and double transverse webs and a single longitudinal connecting-web.

4. A plaiter comprising a matrix formed with alternating single and double transverse webs, and pockets in the double webs, and stiffening-strips located in the pockets.

5. A plaiter comprising a matrix constructed with lower and upper matrix members each formed with alternating and coinciding single and double webs providing pockets, so as to bring the pockets of each matrix member on the same side of the folds.

6. A plaiter comprising a matrix having lower and upper intermeshing matrix members formed with cord-holes in the folds thereof, clamping-bars formed with cord-holes, and the gathering and sustaining cords extending through the cord-holes of the folds and clamping-bars.

7. A plaiter comprising a matrix having a lower matrix member, an upper matrix member, formed integral with the lower matrix member at one side thereof so as to provide a cover having its outer side located in rear of the outer edge of the lower matrix member.

8. A plaiter comprising a matrix having a lower matrix member, and an upper matrix member formed in sections integral with the lower matrix member.

9. A plaiter comprising a matrix having a lower matrix member formed with mixed forms of folds and an upper matrix member having mixed forms of folds intermeshing therewith.

THOMAS W. CASTLEMAN.

Witnesses:
WALTER ALLEN,
EDWIN S. CLARKSON.